(12) United States Patent
Yang

(10) Patent No.: US 12,317,246 B2
(45) Date of Patent: May 27, 2025

(54) METHODS, APPARATUSES AND SYSTEMS FOR CONFIGURING SIDELINK RESOURCE AND READABLE STORAGE MEDIA

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 705 days.

(21) Appl. No.: 17/616,159

(22) PCT Filed: Jun. 13, 2019

(86) PCT No.: PCT/CN2019/091169
§ 371 (c)(1),
(2) Date: Dec. 2, 2021

(87) PCT Pub. No.: WO2020/248202
PCT Pub. Date: Dec. 17, 2020

(65) Prior Publication Data
US 2022/0248417 A1    Aug. 4, 2022

(51) Int. Cl.
*H04W 72/12* (2023.01)
*H04W 36/00* (2009.01)
*H04W 72/30* (2023.01)

(52) U.S. Cl.
CPC .......... *H04W 72/12* (2013.01); *H04W 72/30* (2023.01); *H04W 36/0055* (2013.01)

(58) Field of Classification Search
CPC ..... H04W 72/12; H04W 72/30; H04W 72/20; H04W 48/12; H04W 48/20; H04W 84/18; H04W 92/18; H04W 4/70
See application file for complete search history.

(56) References Cited

U.S. PATENT DOCUMENTS

2015/0382252 A1* 12/2015 Yu .................. H04W 8/005
370/331
2017/0099624 A1* 4/2017 Baghel ............... H04W 4/70
(Continued)

FOREIGN PATENT DOCUMENTS

CN      107852649 A      3/2018
CN      108886767 A      11/2018
(Continued)

OTHER PUBLICATIONS

International Search Report of the International Application No. PCT/CN2019/091169 dated Feb. 24, 2020 with English translation, (4p).
(Continued)

*Primary Examiner* — Scott M Sciacca

(74) *Attorney, Agent, or Firm* — Arch & Lake LLP; Hao Tan; Shen Wang

(57) ABSTRACT

A method of configuring sidelink resource is provided, which belongs to the technical field of wireless communication. The method is performed by a header terminal in a terminal group, and the method includes: when a serving cell of the header terminal is changed to a first cell, an identifier of the first cell is sent to other terminals in the terminal group. The identifier of the first cell is sent by the header terminal, so that a first terminal can receive the identifier of the first cell and acquire a first sidelink resource pool that the first terminal is to use when transmitting sidelink data.

17 Claims, 6 Drawing Sheets

(56) References Cited

U.S. PATENT DOCUMENTS

| | | | |
|---|---|---|---|
| 2017/0142766 A1 | 5/2017 | Kim | |
| 2017/0215119 A1* | 7/2017 | Hong | H04W 36/0066 |
| 2018/0279096 A1 | 9/2018 | Wu | |
| 2018/0376485 A1 | 12/2018 | Kahtava et al. | |
| 2020/0092685 A1* | 3/2020 | Fehrenbach | H04W 84/005 |
| 2020/0099481 A1* | 3/2020 | Pan | H04L 1/1841 |
| 2020/0389257 A1* | 12/2020 | Kung | H04W 4/06 |
| 2021/0195666 A1* | 6/2021 | Luo | H04W 88/04 |
| 2021/0337515 A1* | 10/2021 | Wang | H04W 72/121 |
| 2022/0039082 A1* | 2/2022 | Belleschi | H04W 4/40 |
| 2022/0046593 A1* | 2/2022 | Stanczak | H04W 72/02 |
| 2022/0248417 A1* | 8/2022 | Yang | H04W 72/30 |

FOREIGN PATENT DOCUMENTS

| | | |
|---|---|---|
| CN | 109314897 A | 2/2019 |
| CN | 110383866 A | 10/2019 |
| WO | 2018202798 A1 | 11/2018 |

OTHER PUBLICATIONS

CATT,"Mode 2 Resource Allocation", 3GPP TSG-RAN WG2 Meeting #104 Spokane, USA, Nov. 12-16, 2018, R2-1816889, (4p).

AT&T,"Resource allocation mechanism", 3GPP TSG RAN WG1 Meeting #94 Gothenburg, Sweden, Aug. 20-24, 2018, R1-1809069, (5p).

NTT Docomo, Inc., "Resource allocation mechanism", 3GPP TSG RAN WG1 Meeting #94 Gothenburg, Sweden, Aug. 20-24, 2018, R1-1809159, (7p).

State Intellectual Property Office of the People's Republic of China, Office Action and Search Report Issued in Application No. 201980001056.X, Jan. 29, 2022, (56 pages). (Submitted with Machine/Partial Translation).

ISA State Intellectual Property Office of the People's Republic of China, Written Opinion of the International Searching Authority Issued in Application No. PCT/CN2019/091169, Feb. 24, 2020, WIPO, (6 pages).

LG Electronics Inc."Introduction of V2V services based on LTE sidelink", 3GPP TSG-RAN2 Meeting 95, R2-165836, Gothenburg, Sweden, Aug. 22-26, 2016, (22 pages).

LG Electronics, "Discussion on sidelink resource allocation mechanism", 3GPP TSG RAN WG1 Meeting #94bis, R1-1810283, Chengdu, China, Oct. 8-12, 2018, (7 pages).

ZTE, Sanechips, "Analysis of Mode 2 resource schemes on sidelink", 3GPP TSG RAN WG1 Meeting #95, R1-1812733, Spokane, USA, Nov. 12-16, 2018, (6 pages).

State Intellectual Property Office of the People's Republic of China, Office Action and Search Report Issued in Application No. 2022109873065, Jan. 17, 2025, 19 pages. (Submitted with Machine Translation).

* cited by examiner

When a serving cell of the header terminal is changed to a first cell, send an identifier of the first cell to other terminals in the terminal group — 301

METHODS, APPARATUSES AND SYSTEMS FOR CONFIGURING SIDELINK RESOURCE AND READABLE STORAGE MEDIA

CROSS REFERENCE TO RELATED APPLICATION

This application is the U.S. national phase application of PCT International Application No. PCT/CN2019/091169, filed on Jun. 13, 2019, the entire content of which is incorporated herein by reference for all purposes.

TECHNICAL FIELD

The present disclosure relates to the field of wireless communication technology, and in particular to methods, apparatuses and systems for configuring sidelink resource and readable storage media.

BACKGROUND

With the development of wireless communication technology, there are more and more methods to transmit data between terminals. Transmission through sidelink has become one of main methods of near field communication technology.

In related arts, when data is transmitted between terminals through sidelink technology, it is often to select corresponding sidelink resource and transmit the data through the selected sidelink resource. In a Vehicle to everything scenario, for terminals using sidelink resource to transmit data, a cell where a terminal is located may be changed.

SUMMARY

Methods, apparatuses and systems for configuring sidelink resource and readable storage media are provided. The technical solutions are as follows.

According to a first aspect of the present disclosure, a method of configuring sidelink resource is provided, the method is performed by a header terminal in a terminal group, and includes: in response to that a serving cell of the header terminal is changed to a first cell, sending an identifier of the first cell to other terminals in the terminal group.

According to a second aspect of the present disclosure, a method of configuring sidelink resource is provided, the method is performed by a first terminal in a terminal group, where the first terminal is any terminal other than a header terminal in the terminal group, and the method includes: receiving an identifier of a first cell from the header terminal, where the first cell is a cell to which a serving cell of the header terminal is changed; and acquiring a first sidelink resource pool used by the first terminal according to the identifier of the first cell; the first sidelink resource pool used by the first terminal is used for sidelink data transceiving of the first terminal.

According to a third aspect of the present disclosure, a method of configuring sidelink resource is provided, the method includes: in response to that a serving cell of a header terminal in a terminal group is changed to a first cell, sending, by the header terminal, an identifier of the first cell to other terminals in the terminal group; receiving, by a first terminal, the identifier of the first cell; and acquiring, by the first terminal, a first sidelink resource pool used by the first terminal according to the identifier of the first cell; the first sidelink resource pool used by the first terminal is used for sidelink data transceiving of the first terminal; the first terminal is any terminal other than the header terminal in the terminal group.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION

Figure 1:
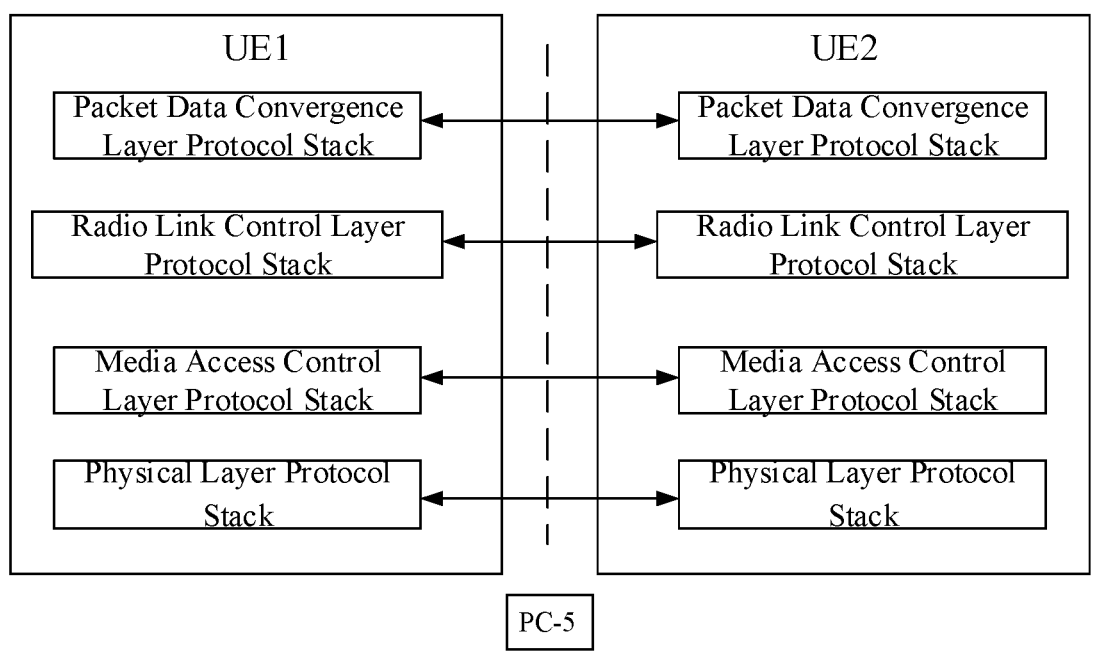
FIG. 1 is a schematic diagram of a PC-5 interface according to one or more examples of the present disclosure.

Examples will be described in detail herein, with examples thereof illustrated in the accompanying drawings. When the following description relates to the accompanying drawings, like numerals in different drawings represent like or similar elements unless otherwise indicated. The implementations described in the following examples do not represent all implements consistent with the present disclosure. Rather, they are merely examples of apparatuses and methods consistent with some aspects of the disclosure as detailed in the appended claims.

It should be understood that "several" mentioned herein refers to one or more, "a plurality" refers to two or more. "and/or", describing an association relationship of associated objects, indicates that there may be three types of relationships, for example, A and/or B may indicate that there are three cases: A alone, both A and B, and B alone. Character "/" generally indicates that associated objects before and after the character are in an "or" relationship. To facilitate understanding, some nouns and application scenarios involved in the present disclosure are introduced briefly below.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Sidelink technology is a near field communication technology in which terminals perform information sidelink through a radio interface (such as a PC5 interface) between each other.

In a fourth generation mobile communication (4G for short) system, that is, a Long Term Evolution (LTE for short) system, sidelink communication is introduced, in which sidelink data transmission can multiplex uplink transmission resource of a Uu interface. FIG. 1 is a schematic diagram illustrating a PC-5 interface according to an example of the present disclosure. As shown in FIG. 1, sidelink data transmission between terminal 1 (or referred to as UE1) and terminal 2 (or referred to as UE2) is to comply with various protocol stacks included in the PC-5 interface shown in FIG. 1. In some examples, terminals transmitting the sidelink data can share used transmission resource. In some examples, in a case that the sidelink data transmission multiplexes the uplink transmission resource of the Uu interface, usually when transmitting and receiving the sidelink data, a time division multiplexing (TDM for short) is adopted, that is, when the uplink transmission resource of the Uu interface is multiplexed, transmission and reception of the sidelink data cannot be performed at the same time.

Sidelink radio resource used by the terminal to transmit the sidelink data are configured based on a sidelink resource pool. The sidelink resource pool includes a transmission resource pool and a reception resource pool. The transmission resource pool indicates a time range and a frequency range of the sidelink radio resource available when transmitting the sidelink data, and the reception resource pool indicates a time range and a frequency range of the sidelink radio resource available when receiving the sidelink data.

In some examples, a base station can have a plurality of cells and control the sidelink radio resource of the plurality of cells. When the terminal transmits data through the sidelink radio resource, the base station can configure a corresponding sidelink resource pool for the terminal according to a cell where the terminal is located. In some examples, when the base station allocates the sidelink radio resource to a terminal that is to perform the sidelink data transmission, base station dynamic scheduling mode and terminal autonomous selection mode can be adopted. In the base station dynamic scheduling mode, the terminal can report its own buffer data to the base station where it is located, and the base station dynamically allocates available sidelink radio resource to the terminal according to the buffer data reported by the terminal. In the base station dynamic scheduling mode, the terminal is to maintain connection with the base station at all times. In some examples, if the terminal acquires the sidelink radio resource in the base station dynamic scheduling mode, the base station can further configure an exception pool for the terminal. When the terminal fails to connect to the base station or cannot maintain the connection with the base station, the terminal can use the exception pool to perform the sidelink data transmission with other terminals.

In the terminal autonomous selection mode, the terminal can perform autonomous selection from sidelink resource pool for autonomous selection configured by the base station. In some examples, the terminal can randomly select resource for transmitting the sidelink data from the sidelink resource pool for autonomous selection configured by the base station. A network can configure the sidelink resource pool for autonomous selection for the terminal by broadcasting system information or a dedicated signaling. The base station introduces an independent System Information Block (SIB for short) for the sidelink resource pool, namely SIB 18, 19, 21, to carry sidelink resource pool configuration for autonomous selection of the cell. The base station can broadcast the SIB information, and carry the sidelink resource pool configuration for autonomous selection of the cell through the SIB, so that the terminal can obtain the radio resource that can be used for sidelink transmission and reception by reading the information broadcast by the base station. In some examples, resource pools for different application scenarios can be configured independently. For example, in scenarios such as vehicle to vehicle (V2V for short) communication, vehicle to infrastructure (V2I for short) communication and vehicle to pedestrian (V2P for short) communication in vehicle to everything (V2X for short) communication, different sidelink resource pools can be configured. The sidelink resource pool configuration can be a sidelink resource pool or a list of a plurality of sidelink resource pools.

In some examples, in a fifth generation mobile communication (5G for short) New Radio (NR for short) system, a concept of group is further introduced for the V2X, that is, a plurality of terminals can form a terminal group, and each terminal can transmit sidelink data to other terminals in the terminal group in a multicast mode. Correspondingly, the other terminals in the terminal group can receive the sidelink data multicast by any terminal. A header terminal (or referred to as header UE) exists in each terminal group, and the header terminal can be responsible for control in the terminal group, for example, the header terminal can control resource coordination when terminal members in the terminal group transmit the sidelink data, and control increase or decrease in number of the terminal members in the terminal group, etc.

In the 5G NR system, system information can further be divided into minimum system information (minimum SI for short) and other system information (other SI for short). The minimum SI can include a Master Information Block (MIB for short) and SIB1. The base station can broadcast the minimum SI constantly. The other SI may include remaining SIBs (for example, SIB17, SIB18, SIB19, etc.), and the remaining SIBs included in the other SI can be selectively requested for by the terminal to the base station, so that the base station can selectively broadcast the remaining SIBs included in the other SI. That is, after a terminal sends a request for the other SI to the base station, the base station will start broadcasting the corresponding other SI. For example, when the terminal needs SIB17, it can send a request for the SIB17 to the base station. After receiving the request from the terminal, the base station can broadcast the SIB17.

In order to prevent the terminal from repeatedly requesting SIBs carrying a same sidelink resource pool configuration in different cells, 5G further introduces an area identifier (area id for short) mechanism for the base station. In some examples, each base station may have its own area identifier, and different base stations may have a same area identifier. Each base station can carry its own area identifier in the broadcast SIB1, so that when the terminal receives the SIB1 broadcast by the base station, it can learn the area identifier of the base station corresponding to the SIB1. The SIB1 broadcast by the base station can further indicate whether the SIB in the other SI and the area identifier remain unchanged. If the terminal receives the SIB1 broadcast by the base station in a certain cell indicating that the SIB in the other SI and the area identifier remain unchanged, when the terminal acquires the SIB of a certain other SI in the base station, if the terminal moves to another cell having a same area identifier with the certain cell, the terminal is not to acquire the SIB which has already been acquired in the certain cell before the movement from the base station corresponding to the another cell after the movement. For example, if the terminal acquires the SIB17 in cell 1, and the SIB1 broadcast by the cell 1 indicates that the SIB in the other SI and the area identifier remain unchanged, when the terminal moves to cell 2 having a same area identifier with the cell 1, the terminal is not to acquire the SIB17 broadcast also by the base station of the cell 2 from the base station of the cell 2, and directly use the SIB17 acquired in the cell 1, that is, the previously acquired SIB17 is still valid in the cell 2. If the SIB17 carries sidelink resource, the terminal can still use, in the cell 2, the sidelink resource carried in the SIB17 acquired in the cell 1 to transmit or receive sidelink data.

In a case that the terminal group transmits data through sidelink, when respective terminals are constantly moving, respective cells where different terminals in the terminal group are located may change successively, thus the respective terminals in the terminal group may be in different cells, and sidelink resource allocation of respective cells may be inconsistent. Sidelink radio resource conflicts when the respective terminals in the terminal group transmit sidelink data, which in turn causes failures of the respective terminal in the terminal group to transmit the sidelink data, and reduces transmission efficiency of the sidelink data.

Figures 2, 3:
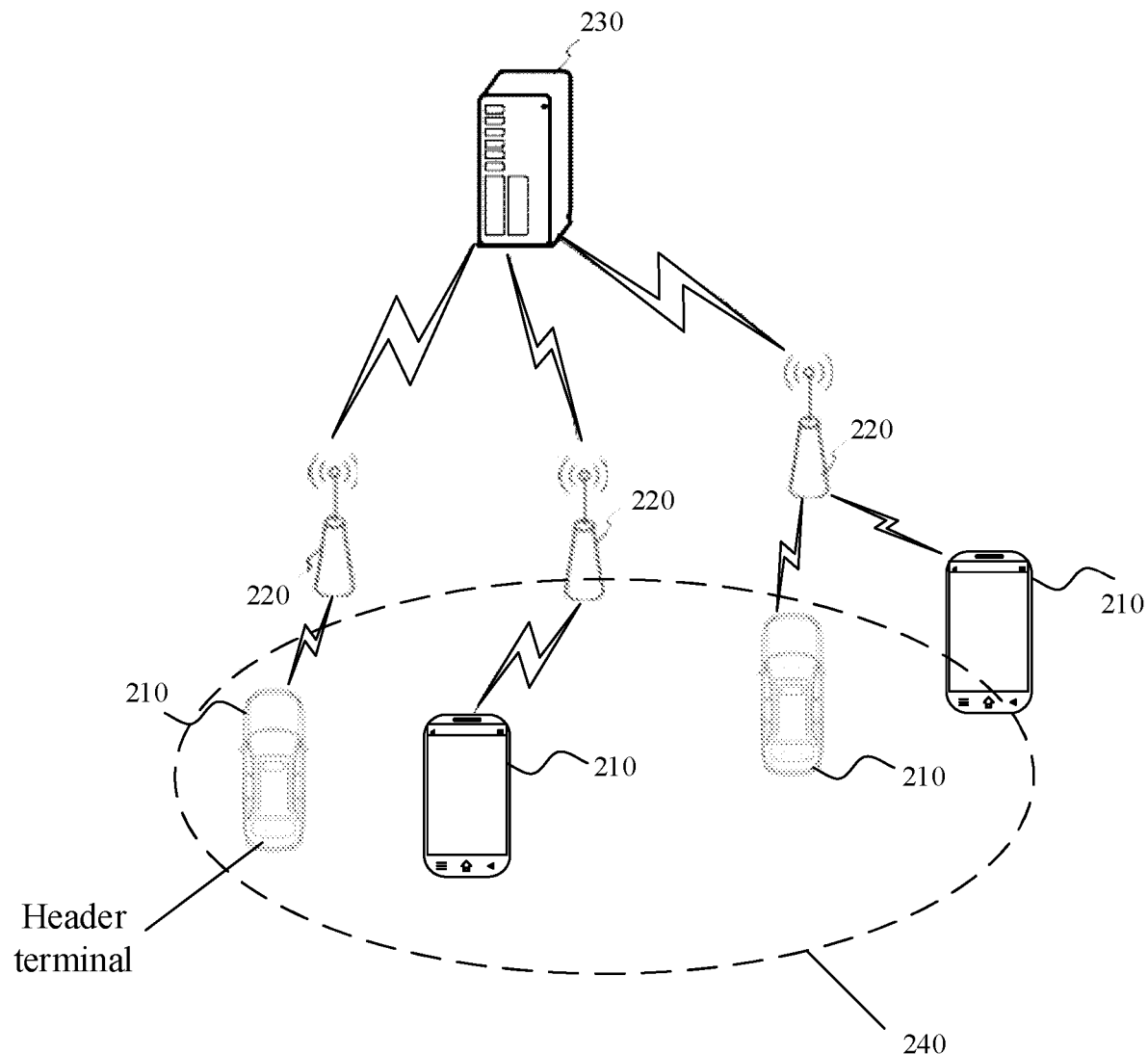
FIG. 2 is a schematic scenario diagram of an implementation environment involved in a method of configuring sidelink resource according to one or more examples of the present disclosure.
FIG. 3 is a flowchart of a method of configuring sidelink resource according to one or more examples of the present disclosure.

FIG. 2 is a schematic scenario diagram illustrating an implementation environment involved in a method of configuring sidelink resource according to an example of the present disclosure. As shown in FIG. 2, the implementation environment may include: several terminals 210 and base stations 220.

A terminal 210 is a wireless communication device that supports a plurality of radio access technologies for sidelink transmission. For example, the terminal 210 may support cellular mobile communication technology, for example, it may support 4G technology and 5G technology. Or, the terminal 210 may also support a next generation mobile communication technology of 5G technology.

For example, the terminal 210 may be an on-vehicle communication device, for example, it may be a trip computer with a wireless communication function, or a wireless communication device connected to the trip computer.

In some examples, the terminal 210 may also be a roadside device, for example, it may be a street lamp, a signal lamp, or other roadside device with a wireless communication function.

In some examples, the terminal 210 may also be a user terminal device, such as a mobile phone (or referred to as a "cellular" phone) and a computer with a mobile terminal, for example, it may be a portable, pocket-sized, handheld, built-in-computer or on-vehicle mobile apparatus. For example, the terminal 210 may be a Station (STA for short), a subscriber unit, a subscriber station, a mobile station, a mobile, a remote station, an access point, a remote terminal, an access terminal, a user terminal, a user agent, a user device, or user equipment (UE for short). Specifically, for example, the terminal 210 may be a mobile terminal such as a smart phone, a tablet computer, and an e-book reader, or may be a smart wearable device such as smart glasses, a smart watch, or a smart bracelet.

A base station 220 may be a network side device in a wireless communication system. The wireless communication system may be a fourth generation mobile communication technology system, also known as a long term evolution LTE system; or, the wireless communication system may also be a 5G system, also known as a new radio (NR for short) system. Or, the wireless communication system may also be a next generation system of the 5G system.

The base station 220 may be an evolved base station (eNB for short) adopted in the 4G system. Or, the base station 220 may also be a base station adopting a central and distributed architecture in the 5G system (gNB for short). When the base station 220 adopts the central and distributed architecture, it usually includes a central unit (CU for short) and at least two distributed units (DUs for short). The central unit is provided with a Packet Data Convergence Protocol (PDCP for short) Layer Protocol Stack, a Radio Link Control (RLC for short) layer and a Media Access Control (MAC for short) Layer Protocol Stack; the distributed unit is provided with a Physical (PHY for short) Layer Protocol Stack. The examples of the present disclosure does not limit the specific implementation of the base station 220.

A wireless connection can be established between the base station 220 and the terminal 210 through an air interface. In different implementations, the air interface is an air interface based on the 4G standard; or, the air interface is an air interface based on 5G standard, for example, the air interface is a new radio; or, the air interface may also be an air interface based on a 5G-based next generation mobile communication network technology standard.

In some examples, the wireless communication system may further include a network management device 230.

The several base stations 220 are connected to the network management device 230 respectively. The network management device 230 may be a core network device in a wireless communication system. For example, the network management device 230 may be a Mobility Management Entity (MME for short) in an Evolved Packet Core (EPC for short) network. Or, the network management device may also be other core network devices, such as a Serving GateWay (SGW for short), a Public Data Network GateWay (PGW for short), and a Policy and Charging Rules Function (PCRF for short) or a Home Subscriber Server (HSS for short), etc. The implementation of the network management device 230 is not limited in the examples of the present disclosure.

In some examples, the wireless communication system may further include a terminal group 240, that is, the terminal group 240 is a terminal group formed by the several terminals 210 mutually. The header terminal may be any terminal in the terminal group 240. In some examples, respective terminals 210 in the terminal group 240 may use the sidelink radio resource to transmit the sidelink data in the wireless communication system.

FIG. 3 is a flowchart illustrating a method of configuring sidelink resource according to an example of the present disclosure. As shown in FIG. 3, the method of configuring sidelink resource can be applied to the implementation environment shown in FIG. 2 and performed by the header terminal in the terminal group of the wireless communication system. The method of configuring sidelink resource may include the following steps.

At step 301, when a serving cell of the header terminal is changed to a first cell, an identifier of the first cell is sent to other terminals in the terminal group.

The identifier of the first cell is used to instruct the other terminals to acquire a first sidelink resource pool; the first sidelink resource pool is coordinated with a second sidelink resource pool configured by the first cell, and the first sidelink resource pool is used for sidelink data transceiving of a first terminal.

In some examples, sending the identifier of the first cell to the other terminals in the terminal group, includes:
  sending the identifier of the first cell to the other terminals in a multicast mode.

In some examples, the method further includes:
  sending the second sidelink resource pool to the other terminals in the terminal group.

In some examples, sending the second sidelink resource pool to the other terminals in the terminal group, includes:
  sending the second sidelink resource pool to the other terminals in a multicast mode.

In some examples, the second sidelink resource pool includes:
  a special resource pool configured by the first cell for the header terminal when the header terminal adopts a resource scheduling mode of dynamic scheduling in the first cell; or,
  an autonomously selected resource pool configured by the first cell for the header terminal when the header terminal adopts a resource scheduling mode of autonomous selection in the first cell.

Thus, when the serving cell of the header terminal is changed to the first cell, the identifier of the first cell is sent to the other terminals in the terminal group. In the present disclosure, the identifier of the first cell is sent by the header terminal, so that the first terminal can receive the identifier of the first cell and acquire the first sidelink resource pool that the first terminal is to use when transmitting the sidelink data. Thus, when the first terminal and the header terminal are in different cells, sidelink resource allocation is still coordinated. In this way, a problem of sidelink resource conflict caused by a case in which the sidelink resource used to transmit the sidelink data between the first terminal and the header terminal is uncoordinated is avoided, and the efficiency of sidelink data transmission between terminals is improved.

Figure 4:
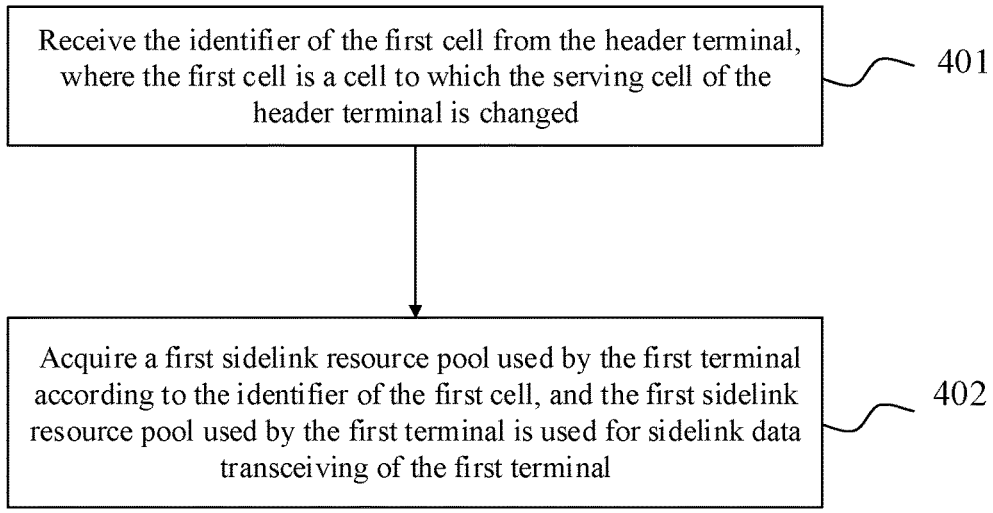
FIG. 4 is a flowchart of a method of configuring sidelink resource according to one or more examples of the present disclosure.

FIG. 4 is a flowchart illustrating a method of configuring sidelink resource according to an example of the present disclosure. As shown in FIG. 4, the method of configuring sidelink resource can be applied to the implementation environment shown in FIG. 2 and performed by a first terminal in the terminal group of the wireless communication system. The first terminal is any terminal other than the header terminal in the terminal group of the wireless communication system. The method of configuring sidelink resource may include the following steps.

At step 401, the identifier of the first cell is received from the header terminal, where the first cell is a cell to which the serving cell of the header terminal is changed.

At step 402, a first sidelink resource pool used by the first terminal is acquired according to the identifier of the first cell, and the first sidelink resource pool used by the first terminal is used for sidelink data transceiving of the first terminal.

In some examples, acquiring the first sidelink resource pool used by the first terminal according to the identifier of the first cell, includes:
  when the first terminal is in an idle state and not in the first cell, acquiring an area identifier of the first cell according to the identifier of the first cell; and
  when it is determined according to the area identifier of the first cell that system information carrying a sidelink resource pool of the first cell is the same as system information carrying a sidelink resource pool of a second cell, the sidelink resource pool configured by the second cell is acquired as the first sidelink resource pool used by the first terminal; the second cell is a cell where the first terminal is located.

In some examples, acquiring the first sidelink resource pool used by the first terminal according to the identifier of the first cell, further includes:
  when it is determined according to the area identifier of the first cell that system information carrying the sidelink resource pool of the first cell is different from system information carrying the sidelink resource pool of the second cell, reading a system information block carrying sidelink resource configuration information broadcast by the first cell; and
  when the system information block carrying the sidelink resource configuration information broadcast by the first cell is successfully read, the first sidelink resource pool used by the first terminal is acquired according to the system information block carrying the sidelink resource configuration information broadcast by the first cell.

In some examples, the method further includes:
  receiving a second sidelink resource pool from the header terminal;
  acquiring the first sidelink resource pool used by the first terminal according to the identifier of the first cell, further includes:
  when reading the system information block carrying the sidelink resource configuration information broadcast by the first cell fails, acquiring the second sidelink resource pool as the first sidelink resource pool used by the first terminal.

In some examples, acquiring the first sidelink resource pool used by the first terminal according to the identifier of the first cell, includes:

when the first terminal is in a connected state, reporting the identifier of the first cell to a base station; and acquiring the first sidelink resource pool used by the first terminal configured by the base station according to the identifier of the first cell.

In some examples, the method further includes:

when the first terminal performs handover to a third cell, and the third cell is not the first cell, reporting the identifier of the first cell to the base station of the third cell; and acquiring a third sidelink resource pool configured by the base station of the third cell according to the identifier of the first cell.

Thus, when the serving cell of the header terminal is changed to the first cell, the identifier of the first cell is sent to other terminals in the terminal group. In the present disclosure, the header terminal sends the identifier of the first cell, so that the first terminal can receive the identifier of the first cell and acquire the first sidelink resource pool that the first terminal is to use when transmitting sidelink data. Thus, when the first terminal and the header terminal are in different cells, sidelink resource allocation is still coordinated. In this way, a problem of sidelink resource conflict caused by a case in which the sidelink resource used to transmit the sidelink data between the first terminal and the header terminal is uncoordinated is avoided, and the efficiency of sidelink data transmission between terminals is improved.

When the header terminal sends the identifier of the first cell and the sidelink resource pool configured by the first cell to other terminals in the current terminal group, a multicast mode or a unicast mode can be used.

Figure 5:
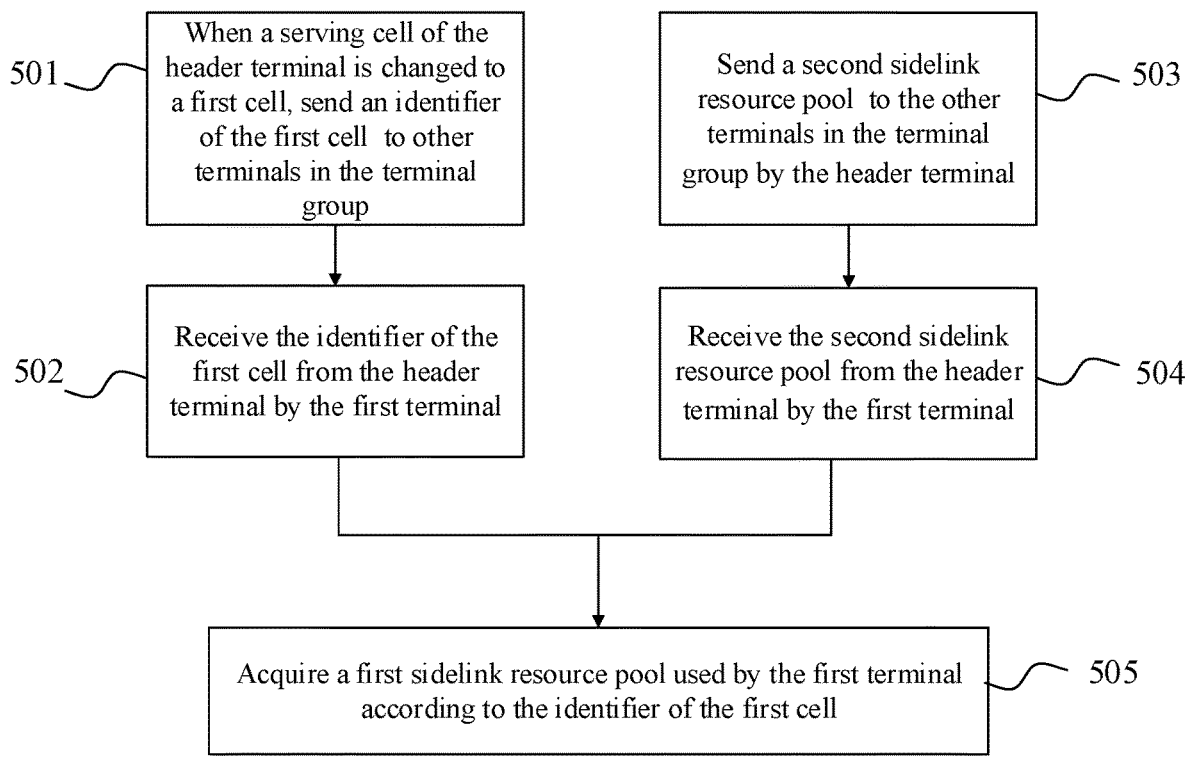
FIG. 5 is a method flowchart of a method of configuring sidelink resource according to one or more examples of the present disclosure.

In a possible implementation, in the present disclosure, a method of configuring sidelink resource is provided. FIG. 5 is a flowchart illustrating a method of configuring sidelink resource according to an example of the present disclosure. As shown in FIG. 5, the method of configuring sidelink resource can be applied to the implementation environment shown in FIG. 2 and performed by a header terminal and a first terminal in a terminal group of the wireless communication system. The first terminal is any terminal other than the header terminal in the terminal group. The method of configuring sidelink resource may include the following steps.

At step 501, when a serving cell of the header terminal is changed to a first cell, an identifier of the first cell is sent to other terminals in the terminal group.

That the serving cell of the header terminal is changed to the first cell, can be that the header terminal changes from a cell where it is currently located to any other cell. In this case, the cell to which the serving cell of the header terminal is changed is the first cell. In some examples the header terminal may perform handover in a serving cell of a same base station, or may perform handover in server cells of different base stations. In some examples, each cell has its own cell identifier, for example, cell 1, cell 2, cell 3, etc. When the serving cell of the header terminal is changed to the first cell, the identifier of the first cell can be acquired, and sent to the other terminals. In some examples, the header terminal may send the identifier of the first cell to the other terminals in a multicast mode. In some examples, the header terminal may send the identifier of the first cell in a multicast mode, and may firstly send the identifier of the first cell to the base station of the first cell, and the base station of the first cell performs multicasting and so on. In some examples, changing the serving cell of the header terminal to the first cell may include any one of the following: the header terminal performs handover to the first cell, or the header terminal performs cell selection and selects the first cell, or the header terminal performs cell reselection and reselects the first cell.

In some examples, the terminal group may include at least two terminals, and one of the at least two terminals may be a header terminal. In some examples, respective terminals included in the terminal group may be in different cells or in a same cell.

Figure 6:
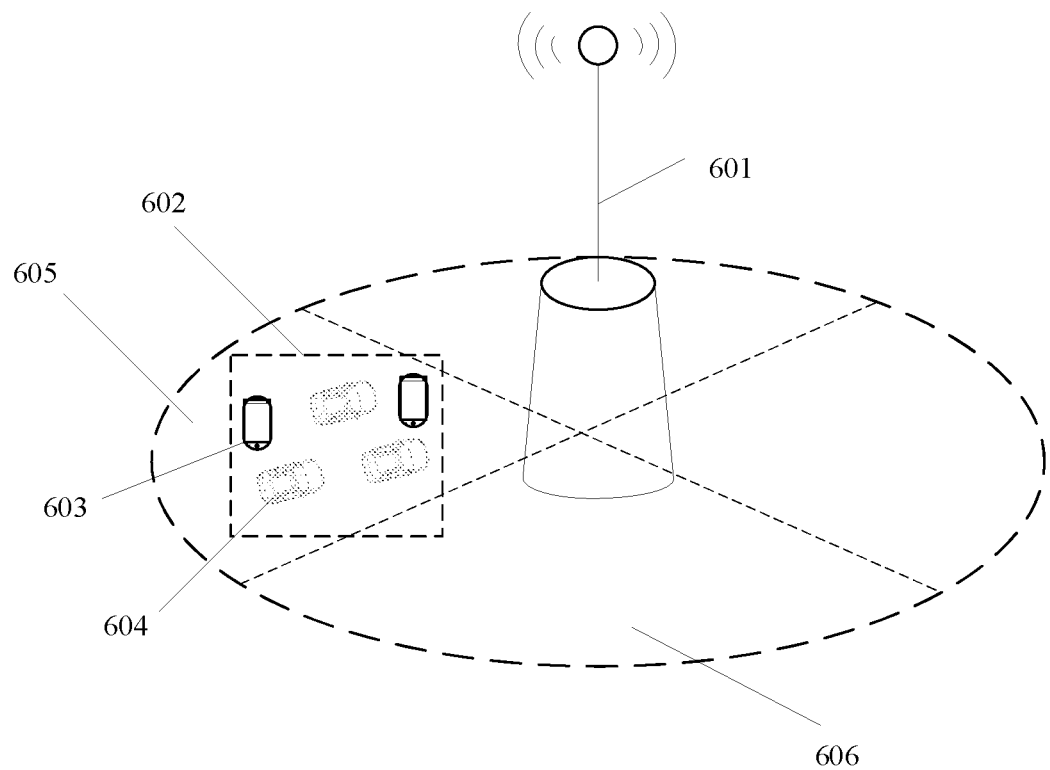
FIG. 6 is a schematic diagram of a scenario where a serving cell for a header terminal is changed according to one or more examples of the present disclosure.

In the V2X communication scenario, due to mobility of each terminal in the terminal group, the header terminal in the terminal group may change from one cell to another cell. FIG. 6 is a schematic diagram illustrating a scenario where a serving cell for a header terminal is changed according to an example of the present disclosure. As shown in FIG. 6, a base station 601, a terminal group 602 (the terminal group 602 includes a header terminal 603 and a first terminal 604), cell 1 605, and cell 2 606 are included. The header terminal 603 can perform handover from the cell 2 606 to the cell 1 605 (in this case, the cell 1 is the first cell), and the header terminal 603 can also perform handover from the cell 1 605 to the cell 2 606 (in this case, the cell 2 is the first cell). In this case, the header terminal 603 can acquire the identifier of the first cell, and multicast the identifier of the first cell to the other terminals in the terminal group.

At step 502, the identifier of the first cell is received by the first terminal from the header terminal.

The first terminal receives the identifier of the first cell from the header terminal, and acquires the identifier of the cell where the header terminal is currently located. In some examples, when the header terminal can send the identifier of the first cell to the other terminals in a multicast mode, the first terminal may receive the identifier of the first cell sent by the header terminal in a multicast mode.

At step 503, a second sidelink resource pool is sent to the other terminals in the terminal group by the header terminal.

The second sidelink resource pool is a sidelink resource pool configured by the first cell.

In some examples, when the header terminal is to transmit, in the changed first cell, sidelink data to the other terminals in the terminal group, the first cell may configure the second sidelink resource pool for the header terminal. Or, when the header terminal still needs to control, in the changed first cell, sidelink data transmission between the other terminals in the terminal group, the first cell may configure the second sidelink resource pool for the header terminal. In some examples, the second sidelink resource pool includes: a special resource pool configured by the first cell to the header terminal when the header terminal adopts the resource scheduling mode of dynamic scheduling in the first cell; or, an autonomously selected resource pool configured by the first cell for the header terminal when the header terminal adopts the resource scheduling mode of autonomous selection in the first cell. That is, a mode for the first cell to configure the second sidelink resource pool for the header terminal can be the dynamic scheduling mode or the autonomous selection mode. When the first cell where the header terminal is located adopts the dynamic scheduling mode to allocate the sidelink resource pool for the header terminal, the header terminal can send the special resource pool allocated by the first cell to the other terminals in the terminal group; when the first cell where the header terminal is located adopts the autonomous selection mode to allocate the sidelink resource pool for the header terminal, the header terminal can send an autonomously selected resource pool by autonomous selection to the other terminals in the terminal group. In some examples, when the header terminal sends the second sidelink resource pool to the other terminals in the terminal group, a multicast mode may be adopted.

At step 504, the second sidelink resource pool is received by the first terminal from the header terminal.

The first terminal receives the second sidelink resource pool from the header terminal, and acquires the second sidelink resource pool configured by the cell where the header terminal is currently located. When sidelink data transmission is to be performed between terminals in the terminal group, the second sidelink resource pool received from the header terminal may be used for transmission. In some examples, when the header terminal sends the second sidelink resource pool to the other terminals in the terminal group in a multicast mode, the first terminal may also receive the second sidelink resource pool sent by the header terminal in a multicast mode.

At step 505, a first sidelink resource pool used by the first terminal is acquired by the first terminal according to the identifier of the first cell.

The first sidelink resource pool is coordinated with the second sidelink resource pool configured by the first cell, and the first sidelink resource pool used by the first terminal is used for sidelink data transceiving of the first terminal.

When the first terminal is to transmit the sidelink data to the other terminals in the terminal group, the first terminal can use the acquired first sidelink resource pool to transmit the sidelink data to the other terminals, so that the first terminal can use the first sidelink resource pool for sidelink data transceiving. The first terminal may acquire the first sidelink resource pool used when the first terminal transmits the sidelink data according to the received identifier of the first cell. In some examples, coordination between the first sidelink resource pool acquired by the first terminal and the second sidelink resource pool configured by the first cell may mean that the first sidelink resource pool acquired by the first terminal and the second sidelink resource pool configured by the first cell can be the same, or it can mean that there is no resource conflict when the first terminal uses the first sidelink resource pool and the other terminals use the second sidelink resource pool configured by the first cell to mutually transmit sidelink data.

In a possible implementation, taking the first terminal in FIG. 6 as an example, when the first terminal is in an idle state and not in the first cell, the first terminal may acquire the area identifier of the first cell according to the identifier of the first cell. In some examples, the first terminal may compare the identifier of the first cell with the identifier of the cell where it is located, thereby learning whether it is in different cells from the header terminal. That is, when the first terminal determines that the identifier of the first cell is different from the identifier of the cell where it is located, it can determine that it is not in the same cell as the header terminal; when the first terminal determines that the identifier of the first cell is the same as the identifier of the cell where it is located, it can determine that it is in the same cell as the header terminal.

In some examples, when the first terminal determines that it is not in the same cell as the header terminal, the first terminal may read the SIB1 of the first cell according to the identifier of the first cell, and acquire the area identifier of the first cell according to the SIB1 of the first cell.

In some examples, the first terminal may further determine, according to the acquired area identifier of the first cell, whether the system information carrying the sidelink resource pool of the first cell is the same as the system information carrying the sidelink resource pool of the second cell. When the first terminal determines according to the area identifier of the first cell that the system information carrying the sidelink resource pool of the first cell is the same as the system information carrying the sidelink resource pool of the second cell, that is, when the first terminal determines that area identifiers carried in SIB is of the two cells (i.e. the first cell and the second cell) are the same, the first terminal can learn that sidelink resource pools configured by the two cells are also the same. In this case, the first terminal may acquire the sidelink resource pool configured by the second cell as the first sidelink resource pool; where the second cell is the cell where the first terminal is currently located. That is to say, when the first terminal determines that the area identifier carried in the SIB1 of the first cell is the same as the area identifier carried in the SIB1 of the second cell, since SIBs carrying V2X resource (i.e. the sidelink resource pool) corresponding to cells with a same area identifier is also the same, the first terminal is not to repeatedly acquire a SIB carrying V2X resource (i.e. the sidelink resource pool) corresponding to another cell (i.e. the first cell). The first terminal can continue to perform sidelink data transmission by using the sidelink resource pool configured by the cell where the first terminal is located.

In a possible implementation, when the first terminal determines according to the area identifier of the first cell that the system information carrying the sidelink resource pool of the first cell is different from the system information carrying the sidelink resource pool of the second cell, that is, when the first terminal determines that area identifiers carried in SIB is of the two cells (i.e. the first cell and the second cell) are different, the first terminal can learn that sidelink resource pools configured by the two cells are also different. The first terminal can further read a system information block carrying sidelink resource configuration information broadcast by the first cell, that is, the first terminal reads a SIB carrying V2X resource broadcast by the first cell; when the first terminal successfully reads the system information block carrying the sidelink resource configuration information broadcast by the first cell, a first sidelink resource pool is acquired according to the system information block carrying the sidelink resource configuration information broadcast by the first cell, that is, the first terminal acquires the sidelink resource pool carried in the system information block carrying the sidelink resource configuration information broadcast by the first cell as the first sidelink resource pool.

In a possible implementation, when the first terminal fails to read the system information block carrying the sidelink resource configuration information broadcast by the first cell, the first terminal may acquire the received second sidelink resource pool sent by the header terminal in a multicast mode as the first sidelink resource pool. In some examples, the failure of the first terminal to read the system information block carrying the sidelink resource configuration information broadcast by the first cell may be caused by the following situations, for example, when the first cell does not broadcast the system information block carrying the sidelink resource configuration information, or when the first terminal is interfered, or when the first terminal is outside coverage of the first cell, it cannot receive the system information block carrying the sidelink resource configuration information broadcast by the first cell. When the first terminal fails to read the system information block carrying the sidelink resource configuration information broadcast by the first cell, the first terminal can transmit the sidelink data by directly using the second sidelink resource pool sent by the header terminal in a multicast mode.

In a possible implementation, still taking the first terminal in FIG. 6 as an example, when the first terminal is in a connected state, the method of acquiring the used first sidelink resource pool by the first terminal to may be as follows: the first terminal can report the identifier of the first cell to the base station corresponding to the cell where the first terminal is located; that is, the first terminal reports the identifier of the first cell to the base station of the second cell. When the base station of the second cell receives the identifier of the first cell reported by the first terminal, it can reconfigure a sidelink resource pool for the first terminal according to the identifier of the first cell, and the base station sends the reconfigured sidelink resource pool to the first terminal. Accordingly, the first terminal can receive the sidelink resource pool reconfigured by the base station for the first terminal. The first terminal then directly acquires the received sidelink resource pool as the first sidelink resource pool.

In a possible implementation, when the first terminal performs handover to a third cell and the third cell is not the first cell, the first terminal may report the identifier of the first cell to the base station of the third cell. Correspondingly, when the base station of the third cell receives the identifier of the first cell reported by the first terminal, it can reconfigure a sidelink resource pool for the first terminal according to the identifier of the first cell, and the base station sends the reconfigured sidelink resource pool to the first cell. Accordingly, the first terminal can receive the sidelink resource pool reconfigured for the first terminal by the base station of the third cell. The first terminal then directly acquires the received sidelink resource pool as the first sidelink resource pool.

Figure 7:
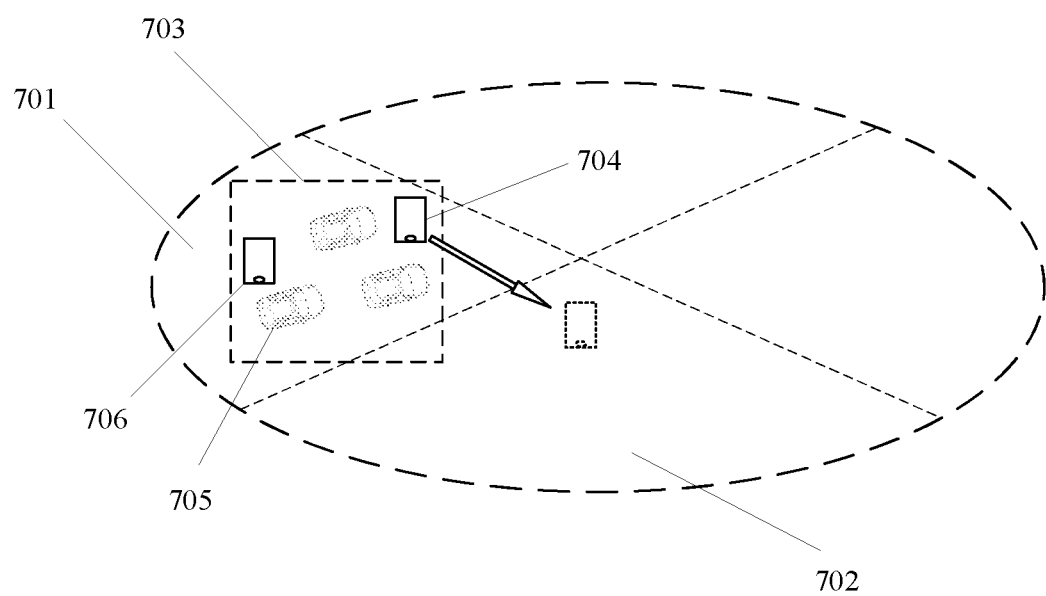
FIG. 7 is a schematic diagram of a scenario in which a header terminal preforms cell handover according to one or more examples of the present disclosure.

The above content is described below with a specific example. FIG. 7 is a schematic diagram illustrating a scenario in which a header terminal performs cell handover according to an example of the present disclosure. As shown in FIG. 7, a first cell 701, a second cell 702 and a terminal group 703 in the first cell 701 are included, where the terminal group 703 includes a header terminal 704, a first terminal 705 and a second terminal 706. The first terminal 705 is in an idle state, and the second terminal 706 is in a connected state. When the header terminal 704 performs handover from the first cell 701 to the second cell 702, the header terminal 704 can send an identifier of the second cell 702 to the first terminal 705 and the second terminal 706 in a multicast mode, and the header terminal 704 can further send a special resource pool and/or an autonomously selected resource pool allocated by the second cell 702 for the header terminal 704 to the first terminal 705 and the second terminal 706 in a multicast mode.

When the first terminal 705 in an idle state receives the identifier of the second cell 702 from the header terminal 704, it can determine that a cell where it is located is different from a cell where the header terminal is located, and further read SIB1 of the second cell 702 to acquire an area identifier of the second cell 702. When an area identifier of the first cell 701 is the same as the area identifier of the second cell 702, the first terminal 705 can continue to transmit sidelink data by using its own sidelink resource pool in the first cell 701. When the area identifier of the first cell 701 is different from the area identifier of the second cell 702, the first terminal 705 is to read a system information block (for example, SIB17, 18, 19, etc. in the second cell 702) carrying sidelink resource configuration information broadcast by the second cell 702, acquire a sidelink resource pool of the system information block carrying the sidelink resource configuration information from the read system information block carrying the sidelink resource configuration information broadcast by the second cell 702, and transmit the sidelink data by using the acquired sidelink resource pool.

When the second cell 702 does not broadcast the system information block carrying the sidelink resource configuration information, the first terminal 705 cannot successfully read the system information block carrying the sidelink resource configuration information broadcast by the second cell 702, the first terminal 705 can transmit the sidelink data by directly using the special resource pool and/or the autonomously selected resource pool sent by the header terminal 704 in a multicast mode.

When the second terminal 706 in a connected state receives the identifier of the second cell 702 from the header terminal 704, it can determine that the cell where it is located is different from the cell where the header terminal is located. In this case, the second terminal 706 can send the identifier of the second cell 702 to a base station of the first cell 701. When the base station of the first cell 701 receives the identifier of the second cell 702 from the second terminal 706, it can reconfigure a sidelink resource pool for the second terminal 706 according to the identifier of the second cell 702 and send the sidelink resource pool to the second terminal 706. In some examples, when the first cell 701 reconfigures the sidelink resource pool for the second terminal 706 according to the identifier of the second cell 702, it may send a message request to a base station of the second cell 702 to request the sidelink resource pool of the second cell 702. The sidelink resource pool configured by the base station of the second cell 702 may be sent to the base station of the first cell 701 by the base station of the second cell 702, and be further sent to the second terminal 706 by the base station of the first cell 701.

In a possible implementation, when the header terminal in FIG. 7 performs handover from the first cell to the second cell, the second terminal 706 may also perform handover from the first cell 701 to another cell, for example, the second terminal 706 may also perform handover to the second cell 702. When the second terminal 706 performs handover to the second cell 702, and finds that the header terminal 704 is in the same cell as itself, the second terminal 706 can report the identifier of the second cell 702 to the second cell 702, and receive the sidelink resource pool reconfigured by the second cell 702 for the second terminal 706. In some examples, when the second terminal 706 performs handover from the second cell 702 to another cell, the second terminal can find that it is in a different cell from the header terminal 704 again. Reference may be made to the steps performed by the second terminal when the header terminal performs handover to the second cell, which will not be repeated herein.

Thus, when a serving cell of the header terminal is changed to the first cell, an identifier of the first cell is sent to other terminals in the terminal group. In the present disclosure, the identifier of the first cell is sent by the header terminal, so that the first terminal can receive the identifier of the first cell and acquire a first sidelink resource pool that the first terminal is to use when transmitting sidelink data. Thus, when the first terminal and the header terminal are in different cells, sidelink resource allocation is still coordinated. In this way, a problem of sidelink resource conflict caused by a case in which the sidelink resource used to transmit the sidelink data between the first terminal and the header terminal is uncoordinated is avoided, and the efficiency of sidelink data transmission between terminals is improved.

Figure 8:
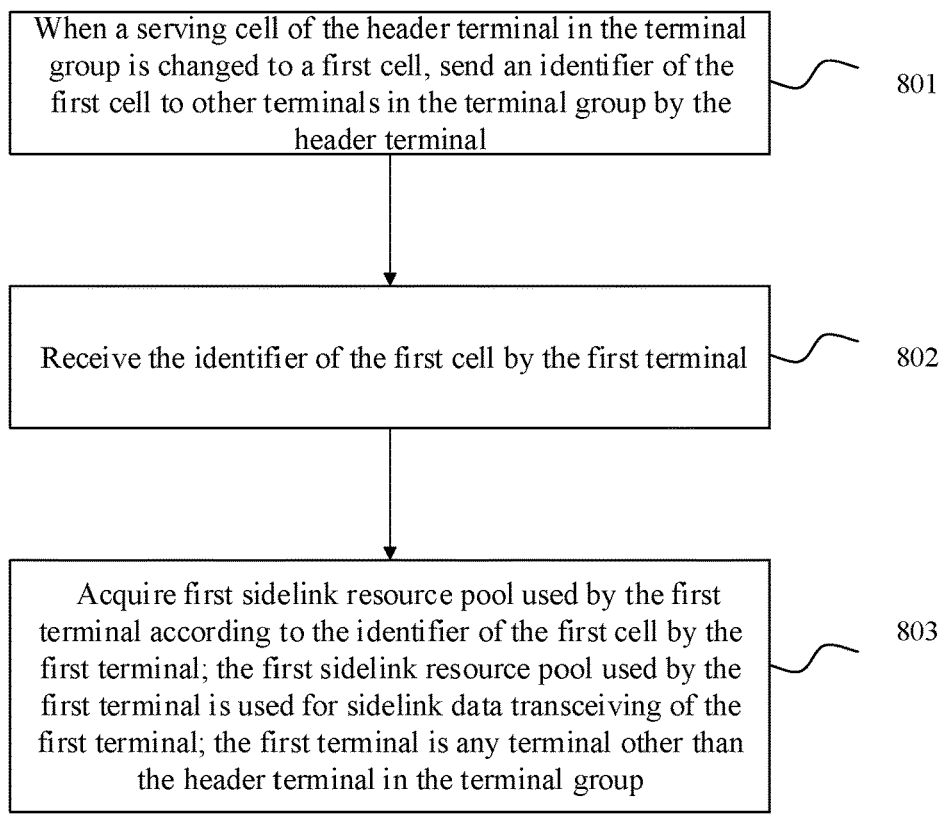
FIG. 8 is a flowchart of a method of configuring sidelink resource according to one or more examples of the present disclosure.

FIG. 8 is a flowchart illustrating a method of configuring sidelink resource according to an example of the present disclosure. As shown in FIG. 8, the method of configuring sidelink resource can be applied to a terminal group including a first terminal and a header terminal, and performed by the first terminal and the header terminal. The method of configuring sidelink resource can include the following steps.

At step 801, when a serving cell of the header terminal in the terminal group is changed to a first cell, an identifier of the first cell is sent to other terminals in the terminal group by the header terminal.

In some examples, in this step, for the implementation in which the header terminal sends the identifier of the first cell to the other terminals in the terminal group, reference can be made to the related descriptions in step 501 in the example of FIG. 5, which will not be repeated herein.

At step 802, the identifier of the first cell is received by the first terminal.

In some examples, in this step, for the implementation in which the first terminal receives the identifier of the first cell, reference may be made to the related descriptions in step 502 in the example of FIG. 5, which will not be repeated herein.

At step 803, a first sidelink resource pool used by the first terminal is acquired by the first terminal according to the identifier of the first cell; the first sidelink resource pool used by the first terminal is used for sidelink data transceiving of the first terminal; the first terminal is any terminal other than the header terminal in the terminal group.

In some examples, in this step, for the implementation in which the first terminal acquires the first sidelink resource pool used by the first terminal according to the identifier of the first cell, reference may be made to the related descriptions in step 505 in the example of FIG. 5, which will not be repeated herein. In some examples, the first terminal and the header terminal in the system may also perform step 503 and step 504 in the example of FIG. 5, which will not be repeated herein.

Thus, when the serving cell of the header terminal is changed to the first cell, the identifier of the first cell is sent to the other terminals in the terminal group. In the present disclosure, the identifier of the first cell is sent by the header terminal, so that the first terminal can receive the identifier of the first cell and acquire the first sidelink resource pool that the first terminal is to use when transmitting sidelink data. Thus, when the first terminal and the header terminal are in different cells, sidelink resource allocation is still coordinated. In this way, a problem of sidelink resource conflict caused by a case in which the sidelink resource used to transmit the sidelink data between the first terminal and the header terminal is uncoordinated is avoided, and the efficiency of sidelink data transmission between terminals is improved.

Figure 9:
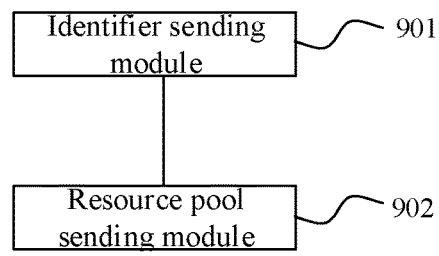
FIG. 9 is a block diagram illustrating an apparatus for configuring sidelink resource according to one or more examples.

FIG. 9 is a block diagram illustrating an apparatus for configuring sidelink resource according to an example. As shown in FIG. 9, the apparatus for configuring sidelink resource may be implemented as all or part of the header terminal in the implementation environment as shown in FIG. 2 through hardware or a combination of software and hardware, to perform the steps performed by the header terminal in any one of the examples shown in FIG. 3, FIG. 5, or FIG. 8. The apparatus includes:

an identifier sending module 901, configured to, in response to that a serving cell of the header terminal is changed to a first cell, send an identifier of the first cell to other terminals in the terminal group.

In some examples, the identifier sending module is configured to;
send the identifier of the first cell to the other terminals in a multicast mode.

In some examples, the apparatus further includes:
a resource pool sending module 902, configured to send a second sidelink resource pool to the other terminals in the terminal group.

In some examples, the resource pool sending module is configured to:
send the second sidelink resource pool to the other terminals in a multicast mode.

In some examples, the second sidelink resource pool includes:
a special resource pool configured by the first cell for the header terminal in a case that the header terminal adopts a resource scheduling mode of dynamic scheduling in the first cell; or, an autonomously selected resource pool configured by the first cell for the header terminal in a case that the header terminal adopts a resource scheduling mode of autonomous selection in the first cell.

Figure 10:
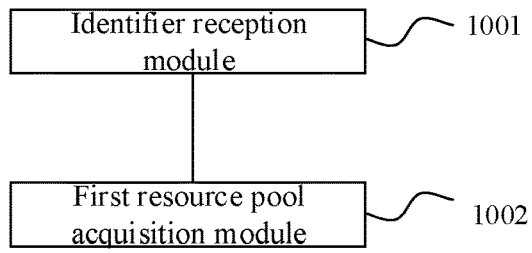
FIG. 10 is a block diagram illustrating an apparatus for configuring sidelink resource according to one or more examples.

FIG. 10 is a block diagram illustrating an apparatus for configuring sidelink resource according to an example. As shown in FIG. 10, the apparatus for configuring sidelink resource may be implemented as all or part of the first terminal in the implementation environment as shown in FIG. 2 through hardware or a combination of software and hardware, to perform the steps performed by the header terminal in any one of the examples shown in FIG. 4, FIG. 5, or FIG. 8. The apparatus includes:

an identifier reception module 1001, configured to receive an identifier of a first cell from the header terminal, where the first cell is a cell to which a serving cell of the header terminal is changed; and a first resource pool acquisition module 1002, configured to acquire a first sidelink resource pool used by the first terminal according to the identifier of the first cell; the first sidelink resource pool used by the first terminal is used for sidelink data transceiving of the first terminal.

In some examples, the first resource pool acquisition module 1002 includes an area identifier acquisition unit and a first resource pool acquisition unit;
the area identifier acquisition unit is configured to, in response to that the first terminal is in an idle state and not in the first cell, acquire an area identifier of the first cell according to the identifier of the first cell; and
the first resource pool acquisition unit is configured to, in response to determining according to the area identifier of the first cell that system information carrying a sidelink resource pool of the first cell is the same as system information carrying a sidelink resource pool of a second cell, acquire the sidelink resource pool carried in the system information of the first cell as the first sidelink resource pool used by the first terminal; the second cell is a cell where the first terminal is located.

In some examples, the first resource pool acquisition module 1002 further includes a system information block reading unit and a second resource pool acquisition unit:
the system information block reading unit is configured to, in response to determining according to the area identifier of the first cell that the system information carrying the sidelink resource pool of the first cell is different from the system information carrying the sidelink resource pool of the second cell, read a system information block carrying sidelink resource configuration information broadcast by the first cell; and the second resource pool acquisition unit is configured to, in response to successfully reading the system information block carrying the sidelink resource configuration information broadcast by the first cell, acquire the first sidelink resource pool used by the first terminal according to the system information block carrying the sidelink resource configuration information broadcast by the first cell.

In some examples, the apparatus further includes:
a resource pool reception module, configured to receive a second sidelink resource pool from the header terminal;
the first resource pool acquisition module 1002 further includes:
a third resource pool acquisition unit, configured to, in response to that reading the system information block carrying the sidelink resource configuration information broadcast by the first cell fails, acquire the second sidelink resource pool as the first sidelink resource pool used by the first terminal.

In some examples, the first resource pool acquisition module 1002 includes an identifier reporting unit and a fourth resource pool acquisition unit:
the identifier reporting unit is configured to, in response to that the first terminal is in a connected state, report the identifier of the first cell to a base station; and
the fourth resource pool acquisition unit is configured to acquire the first sidelink resource pool used by the first terminal configured by the base station according to the identifier of the first cell.

In some examples, the apparatus further includes:
an identifier reporting module, configured to in response to that the first terminal performs handover to a third cell, and the third cell is not the first cell, report the identifier of the first cell to the base station of the third cell; and
a second resource pool acquisition module, configured to acquire a third sidelink resource pool configured by the base station of the third cell according to the identifier of the first cell.

It should be noted that, when the apparatuses provided in the above examples implements its functions, only the division of the above-mentioned functional modules is used as an example for illustration. In actual applications, the above-mentioned functions can be implemented by different functional modules according to actual needs. That is, a structure of an apparatus is divided into different functional modules to implement all or part of the functions described above.

Regarding the apparatuses in the above-mentioned examples, the method for each module to perform an operation has been described in detail in the examples of the method, and detailed description will not be repeated herein.

An apparatus for configuring sidelink resource is provided according to an example of the present disclosure which can implement all or part of the steps performed by the header terminal in the examples as shown in FIG. 3, FIG. 5, or FIG. 8 in the present disclosure. The apparatus includes: a processor; and a memory for storing instructions executable by the processor,
where the processor is configured to:
in response to that a serving cell of the header terminal is changed to a first cell, send an identifier of the first cell to other terminals in the terminal group.

In some examples, when sending the identifier of the first cell to the other terminals in the terminal group, the processor is configured to:
send the identifier of the first cell to the other terminals in a multicast mode.

In some examples, the processor is further configured to:
send a second sidelink resource pool to the other terminals in the terminal group.

In some examples, when sending the second sidelink resource pool to the other terminals in the terminal group, the processor is configured to:
send the second sidelink resource pool to the other terminals in a multicast mode.

In some examples, the second sidelink resource pool includes:
a special resource pool configured by the first cell for the header terminal in a case that the header terminal adopts a resource scheduling mode of dynamic scheduling in the first cell; or,
an autonomously selected resource pool configured by the first cell for the header terminal in a case that the header terminal adopts a resource scheduling mode of autonomous selection in the first cell.

An apparatus for configuring sidelink resource is provided according to an example of the present disclosure which can implement all or part of the steps performed by the first terminal in the examples as shown in FIG. 4, FIG. 5, or FIG. 8 in the present disclosure. The apparatus includes: a processor; and a memory for storing instructions executable by the processor;
where the processor is configured to:
receive an identifier of a first cell from the header terminal, where the first cell is a cell to which a serving cell of the header terminal is changed; and
acquire a first sidelink resource pool used by the first terminal according to the identifier of the first cell; the first sidelink resource pool used by the first terminal is used for sidelink data transceiving of the first terminal.

In some examples, when acquiring the first sidelink resource pool used by the first terminal according to the identifier of the first cell, the processor is configured to:
in response to that the first terminal is in an idle state and not in the first cell, acquire an area identifier of the first cell according to the identifier of the first cell; and
in response to determining according to the area identifier of the first cell that system information carrying a sidelink resource pool of the first cell is the same as system information carrying a sidelink resource pool of a second cell, acquire the sidelink resource pool carried in the system information of the first cell as the first sidelink resource pool used by the first terminal; the second cell is a cell where the first terminal is located.

In some examples, when acquiring the first sidelink resource pool used by the first terminal according to the identifier of the first cell, the processor is further configured to:
in response to determining according to the area identifier of the first cell that the system information carrying the sidelink resource pool of the first cell is different from the system information carrying the sidelink resource pool of the second cell, read a system information block carrying sidelink resource configuration information broadcast by the first cell; and
in response to successfully reading the system information block carrying the sidelink resource configuration information broadcast by the first cell, acquire the first sidelink resource pool used by the first terminal according to the system information block carrying the sidelink resource configuration information broadcast by the first cell.

In some examples, the processor is further configured to:
receive a second sidelink resource pool from the header terminal;
when acquiring the first sidelink resource pool used by the first terminal according to the identifier of the first cell, the processor is further configured to:
  in response to that reading the system information block carrying the sidelink resource configuration information broadcast by the first cell fails, acquire the second sidelink resource pool as the first sidelink resource pool used by the first terminal.

In some examples, when acquiring the first sidelink resource pool used by the first terminal according to the identifier of the first cell, the processor is configured to:
  in response to that the first terminal is in a connected state, report the identifier of the first cell to a base station; and
  acquire the first sidelink resource pool used by the first terminal configured by the base station according to the identifier of the first cell.

In some examples, the processor is further configured to:
  in response to that the first terminal performs handover to a third cell, and the third cell is not the first cell, report the identifier of the first cell to the base station of the third cell; and
  acquire a third sidelink resource pool configured by the base station of the third cell according to the identifier of the first cell.

A system for configuring sidelink resource is provided according to an example of the present disclosure. The system includes: a header terminal in a terminal group and a first terminal, and the first terminal is any terminal other than the header terminal in the terminal group.

The header terminal includes the apparatus for configuring sidelink resource as shown in FIG. 9; the first terminal includes the apparatus for configuring sidelink resource as shown in FIG. 10.

The above description mainly takes the terminal as an example to introduce the solutions provided by the examples of the present disclosure. It can be understood that, in order to implement the above-mentioned functions, the terminal includes hardware structures and/or software modules corresponding to respective functions. In combination with the modules and algorithm steps of the examples described in the examples disclosed in the present disclosure, the examples of the present disclosure can be implemented in the form of hardware or a combination of hardware and computer software. Whether a certain function is implemented by hardware or computer software-driven hardware depends on a specific application and design constraint conditions of a technical solution. Those skilled in the art can use different methods for each specific application to implement the described functions, but such implementation should not be considered as going beyond the scope of the technical solutions of the examples of the present disclosure.

Figure 11:
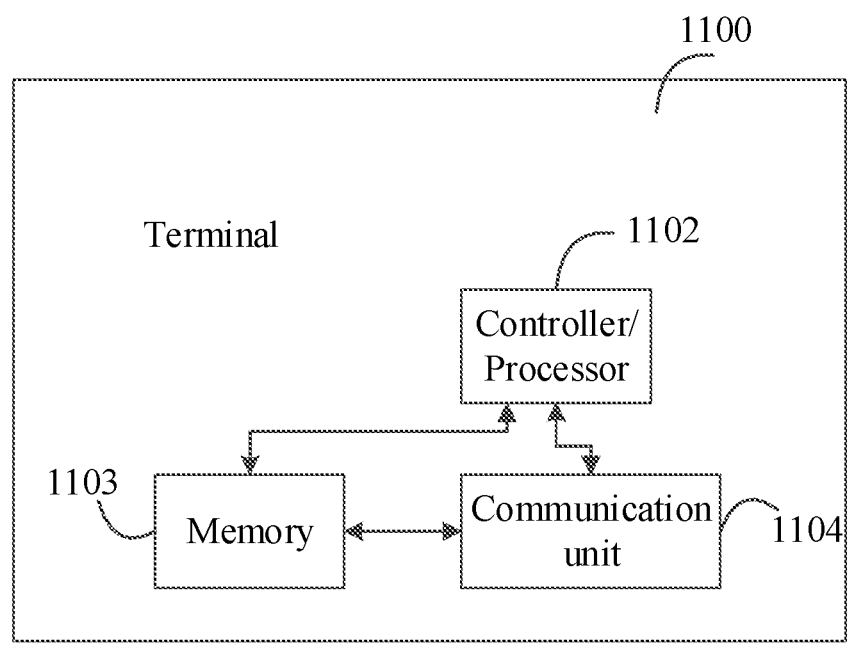
FIG. 11 is a schematic structural diagram of a terminal according to one or more examples.

FIG. 11 is a schematic structural diagram of a terminal according to an example.

The terminal 1100 includes a communication unit 1104 and a processor 1102. The processor 1102 may also be a controller, which is represented as "controller/processor 1102" in FIG. 11. The communication unit 1104 is used to support the terminal to communicate with other network devices (for example, base stations, other terminals, gateways, etc.).

Further, the terminal 1100 may further include a memory 1103, and the memory 1103 is configured to store program codes and data of the terminal 1100.

It should be understood that FIG. 11 only shows a simplified design of the terminal 1100. In practical applications, the terminal 1100 may include any number of processors, controllers, memories, communication units, etc., and all terminals that can implement the examples of the present disclosure are within the protection scope of the present disclosure.

Those skilled in the art should be aware that, in one or more of the above-mentioned examples, the functions described in the examples of the present disclosure may be implemented by hardware, software, firmware, or any combination thereof. When implemented by software, these functions can be stored in a computer-readable medium or transmitted as one or more instructions or codes on the computer-readable medium. The computer-readable medium includes a computer storage medium and a communication medium, where the communication medium includes any medium that facilitates transfer of a computer program from one place to another. The storage medium may be any available medium that can be accessed by a general-purpose or special-purpose computer.

A computer storage medium for storing computer software instructions applied to the above-mentioned first terminal is also provided in an example of the present disclosure, which includes a program for performing the above-mentioned methods of configuring sidelink resource.

A computer storage medium for storing computer software instructions applied to the above-mentioned header terminal is also provided in an example of the present disclosure, which includes a program for performing the above-mentioned methods of configuring sidelink resource.

According to another aspect of the present disclosure, an apparatus for configuring sidelink resource is provided, the apparatus is applied to a header terminal in a terminal group, and includes: a processor; and a memory for storing instructions executable by the processor, where the processor is configured to: in response to that a serving cell of the header terminal is changed to a first cell, send an identifier of the first cell to other terminals in the terminal group.

According to yet another aspect of the present disclosure, an apparatus for configuring sidelink resource is provided, the apparatus is applied to a first terminal in a terminal group, where the first terminal is any terminal other than a header terminal in the terminal group, and the apparatus includes: a processor; and a memory for storing instructions executable by the processor, where the processor is configured to: receive an identifier of a first cell from the header terminal, where the first cell is a cell to which a serving cell of the header terminal is changed; and acquire a first sidelink resource pool used by the first terminal according to the identifier of the first cell; the first sidelink resource pool used by the first terminal is used for sidelink data transceiving of the first terminal.

According to another aspect of the present disclosure, a system for configuring sidelink resource is provided, where the system includes a header terminal and a first terminal in a terminal group; the header terminal includes the apparatus for configuring sidelink resource according to the fourth aspect; the first terminal includes the apparatus for configuring sidelink resource according to the fifth aspect.

The technical solutions provided by the present disclosure may include the following beneficial effects.

When the serving cell of the header terminal is changed to the first cell, the identifier of the first cell is sent to the other terminals in the terminal group. In the present disclosure, the identifier of the first cell is sent by the header terminal, so that the first terminal can receive the identifier of the first cell and acquire the first sidelink resource pool that the first terminal is to use when transmitting the sidelink data. Thus, when the first terminal and the header terminal are in different cells, sidelink resource allocation is still coordinated. In this way, a problem of sidelink resource conflict caused by a case in which the sidelink resource used to transmit the sidelink data between the first terminal and the header terminal is uncoordinated is avoided, and the efficiency of sidelink data transmission between terminals is improved.

Those skilled in the art will easily think of other examples of the present disclosure after considering the specification and practicing the invention disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the examples are to be regarded as exemplary only, and the true scope and spirit of the present disclosure are limited by the claims.

It should be understood that the present disclosure is not limited to the precise structures that have been described above and shown in the drawings, and various modifications and changes can be made without departing from its scope. The scope of the present disclosure is only limited by the claims.

The invention claimed is:

1. A method of configuring sidelink resource, comprising:
sending, by a header terminal in a terminal group, an identifier of the first cell to other terminals in the terminal group, in response to that a serving cell of the header terminal is changed to a first cell; and
acquiring, by a first terminal in the terminal group, a first sidelink resource pool used by the first terminal according to the identifier of the first cell,
wherein acquiring the first sidelink resource pool used by the first terminal according to the identifier of the first cell comprises:
acquiring an area identifier of the first cell according to the identifier of the first cell; and
in response to determining, according to the area identifier of the first cell, that system information carrying a sidelink resource pool of the first cell is same as system information carrying a sidelink resource pool of a second cell, acquiring the sidelink resource pool carried in the system information of the first cell as the first sidelink resource pool used by the first terminal, wherein the second cell is a cell where the first terminal is located;
wherein the first sidelink resource pool used by the first terminal is configured for sidelink data transceiving of the first terminal, and the first terminal is any one terminal other than the header terminal in the terminal group.

2. The method of claim 1, wherein sending the identifier of the first cell to the other terminals in the terminal group, comprises:
sending the identifier of the first cell to the other terminals in a multicast mode.

3. The method of claim 1, further comprising:
sending a second sidelink resource pool to the other terminals in the terminal group.

4. The method of claim 3, wherein sending the second sidelink resource pool to the other terminals in the terminal group, comprises:
sending the second sidelink resource pool to the other terminals in a multicast mode.

5. The method of claim 4, wherein the second sidelink resource pool comprises:
a special resource pool configured by the first cell for the header terminal in a case that the header terminal adopts a resource scheduling mode of dynamic scheduling in the first cell; or
an autonomously selected resource pool configured by the first cell for the header terminal in a case that the header terminal adopts a resource scheduling mode of autonomous selection in the first cell.

6. An apparatus for configuring sidelink resource applied to a header terminal in a terminal group, comprising:
a processor; and
a memory for storing instructions executable by the processor,
wherein the processor is configured to perform the method as claimed in claim 1.

7. The apparatus of claim 6, wherein when sending the identifier of the first cell to the other terminals in the terminal group, the processor is configured to send the identifier of the first cell to the other terminals in a multicast mode.

8. The apparatus of claim 6, the processor is further configured to send a second sidelink resource pool to the other terminals in the terminal group.

9. The apparatus of claim 8, wherein when sending the second sidelink resource pool to the other terminals in the terminal group, the processor is configured to send the second sidelink resource pool to the other terminals in a multicast mode.

10. The apparatus of claim 9, wherein the second sidelink resource pool comprises:
a special resource pool configured by the first cell for the header terminal in a case that the header terminal adopts a resource scheduling mode of dynamic scheduling in the first cell; or
an autonomously selected resource pool configured by the first cell for the header terminal in a case that the header terminal adopts a resource scheduling mode of autonomous selection in the first cell.

11. A method of configuring sidelink resource, comprising:
receiving, by a first terminal in a terminal group, an identifier of a first cell from a header terminal, wherein the first terminal is any one terminal other than a header terminal in the terminal group, and the first cell is a cell to which a serving cell of the header terminal is changed; and
acquiring a first sidelink resource pool used by the first terminal according to the identifier of the first cell,
wherein acquiring the first sidelink resource pool used by the first terminal according to the identifier of the first cell comprises:
acquiring an area identifier of the first cell according to the identifier of the first cell; and
in response to determining, according to the area identifier of the first cell, that system information carrying a sidelink resource pool of the first cell is same as system information carrying a sidelink resource pool of a second cell, acquiring the sidelink resource pool carried in the system information of the first cell as the first sidelink resource pool used by the first terminal, wherein the second cell is a cell where the first terminal is located; wherein the first sidelink resource pool used by the first terminal is configured for sidelink data transceiving of the first terminal.

12. The method of claim 11, wherein acquiring the first sidelink resource pool used by the first terminal according to the identifier of the first cell, further comprises:
in response to determining, according to the area identifier of the first cell, that the system information carrying the sidelink resource pool of the first cell is different from the system information carrying the sidelink resource pool of the second cell, reading a system information block carrying sidelink resource configuration information broadcast by the first cell; and
in response to successfully reading the system information block carrying the sidelink resource configuration information broadcast by the first cell, acquiring the first sidelink resource pool used by the first terminal according to the system information block carrying the sidelink resource configuration information broadcast by the first cell.

13. The method of claim 12, further comprising:
receiving a second sidelink resource pool from the header terminal; and
acquiring the first sidelink resource pool used by the first terminal according to the identifier of the first cell, further comprises:
in response to that reading the system information block carrying the sidelink resource configuration information broadcast by the first cell fails, acquiring the second sidelink resource pool as the first sidelink resource pool used by the first terminal.

14. The method of claim 11, wherein acquiring the first sidelink resource pool used by the first terminal according to the identifier of the first cell, comprises:
in response to that the first terminal is in a connected state, reporting the identifier of the first cell to a base station; and
acquiring the first sidelink resource pool used by the first terminal configured by the base station according to the identifier of the first cell.

15. The method of claim 14, further comprising:
in response to that the first terminal performs handover to a third cell, and the third cell is not the first cell, reporting the identifier of the first cell to the base station of the third cell; and
acquiring a third sidelink resource pool configured by the base station of the third cell according to the identifier of the first cell.

16. An apparatus for configuring sidelink resource applied to a first terminal in a terminal group, wherein the first terminal is any terminal other than a header terminal in the terminal group, and the apparatus comprises:
a processor; and
a memory for storing instructions executable by the processor,
wherein the processor is configured to perform the method as claimed in claim 11.

17. A method of configuring sidelink resource, comprising:
in response to that a serving cell of a header terminal in a terminal group is changed to a first cell, sending, by the header terminal, an identifier of the first cell to other terminals in the terminal group;
receiving, by a first terminal, the identifier of the first cell; and
acquiring, by the first terminal, a first sidelink resource pool used by the first terminal according to the identifier of the first cell,
wherein acquiring the first sidelink resource pool used by the first terminal according to the identifier of the first cell comprises:
acquiring an area identifier of the first cell according to the identifier of the first cell; and
in response to determining, according to the area identifier of the first cell, that system information carrying a sidelink resource pool of the first cell is same as system information carrying a sidelink resource pool of a second cell, acquiring the sidelink resource pool carried in the system information of the first cell as the first sidelink resource pool used by the first terminal, wherein the second cell is a cell where the first terminal is located;
wherein the first sidelink resource pool used by the first terminal is configured for sidelink data transceiving of the first terminal, and the first terminal is any one terminal other than the header terminal in the terminal group.

* * * * *